US006547506B1

(12) United States Patent
Jacob

(10) Patent No.: US 6,547,506 B1
(45) Date of Patent: Apr. 15, 2003

(54) MULTI-TASK TRUCK

(76) Inventor: Albert Kirk Jacob, 6221 Milolii Pl., Honolulu, HI (US) 96825

( * ) Notice: Subject to any disclaimer, the term of this patent is extended or adjusted under 35 U.S.C. 154(b) by 182 days.

(21) Appl. No.: 09/701,030

(22) PCT Filed: Nov. 22, 2000

(86) PCT No.: PCT/US00/32044
§ 371 (c)(1),
(2), (4) Date: Nov. 22, 2000

(87) PCT Pub. No.: WO01/38136
PCT Pub. Date: May 31, 2001

Related U.S. Application Data
(60) Provisional application No. 60/167,169, filed on Nov. 23, 1999.

(51) Int. Cl.[7] .............................. B60P 1/54; B60P 1/64
(52) U.S. Cl. ...................... 414/498; 414/550; 296/37.6
(58) Field of Search ............................... 414/486, 491, 414/498, 520, 547, 550; 296/37.6; 224/404, 542

(56) References Cited

U.S. PATENT DOCUMENTS

| | | | | |
|---|---|---|---|---|
| 3,473,679 A | * | 10/1969 | Wiechel | 414/498 |
| 3,811,581 A | * | 5/1974 | Van Der Lely | 172/272 |
| 4,078,818 A | * | 3/1978 | Donnelly | 212/261 |
| 4,750,855 A | * | 6/1988 | Anderson | 296/184 |
| 5,098,019 A | * | 3/1992 | Landefeld | 239/172 |
| 5,467,827 A | * | 11/1995 | McLoughlin | 137/355.17 |
| 5,468,120 A | * | 11/1995 | Krob | 414/549 |
| 5,853,116 A | * | 12/1998 | Schreiner | 220/4.29 |
| 5,934,860 A | * | 8/1999 | Hotte | 414/498 |
| 6,186,575 B1 | * | 2/2001 | Fisher et al. | 296/100.02 |
| 6,409,457 B1 | * | 6/2002 | Korycan et al. | 180/242 |
| 6,412,847 B2 | * | 7/2002 | De Gaillard | 296/100.09 |

FOREIGN PATENT DOCUMENTS

| | | | | |
|---|---|---|---|---|
| JP | 56-138035 | * | 10/1981 | 414/547 |
| NL | 9002032 | * | 4/1992 | 414/498 |
| SU | 1641671 | * | 4/1991 | 414/547 |

* cited by examiner

Primary Examiner—James W. Keenan
(74) Attorney, Agent, or Firm—Martin E. Hsia

(57) ABSTRACT

A truck having either a segmented body configured to receive a plurality of form fitted containers or a substitute body that can be interchangeably mounted on the chassis of the truck. The truck is also provided with a multi-purpose crane and a plurality of hydraulic valve banks mounted to the chassis of the truck, whereby the crane and hydraulic tools can be operated simultaneously. The truck may also be configured with various other features such as a hose reel or a snow plow.

3 Claims, 2 Drawing Sheets

MULTI-TASK TRUCK

This application claims the benefit of provisional application Ser. No. 60/167,169 filed Nov. 23, 1999.

TECHNICAL FIELD

This invention relates to a multi-task truck that can be configured with various combinations of features and capabilities so that municipalities and other users of the truck can achieve economic and operational efficiencies.

BACKGROUND ART

Trucks have been used for maintaining and cleaning municipal water facilities for decades. In 1977, the inventor designed a truck that had a front mounted hose reel for sewer cleaning, together with a crane and a body that was divided into three segments. Containers configured to be received in each of the three segments were provided for holding parts, bricks, and other materials.

Various manufacturers of trucks have offered various options for customizing trucks, including, for example, providing hydraulic work tools that could operate off a truck's hydraulic system.

Some trucks have interchangeable bodies on a single chassis by providing shear plates on a body that can be bolted to the chassis, or rollers on a body that can roll onto rails provided on a chassis. A particular body (such as a garbage truck body) can then be placed on the shear plates (or rolled onto the rails), so that the assembly becomes a garbage truck. The garbage truck body can later be replaced with another body (a dump truck, for example) in a similar manner. Although multi-task trucks have previously been invented, no multi-task trucks have provided the abilities to serve in a wide variety of capacities.

It is therefore an object of this invention to provide an improved multi-task truck that can perform a wider variety of functions than previous multi-task trucks.

It is a further object of this invention to provide such an improved multi-task truck that uses conventional components for ease and economy of manufacture.

DISCLOSURE OF INVENTION

These and other objects are achieved by a truck comprising a front mounted hose reel, replaceable with a snow plow, a multi-purpose crane, one or more hydraulic hose reels and a winch and bucket assembly at the end of the crane boom, hydraulic work tools powered by the crane's hydraulic system, a segmented body configured to receive a plurality of form fitted containers, wherein the body of the truck can be interchangeably mounted on a chassis.

BEST MODES FOR CARRYING OUT INVENTION

The presently preferred best modes for carrying out the present invention are illustrated by way of example in FIGS. 1 to 4.

Figure 1:
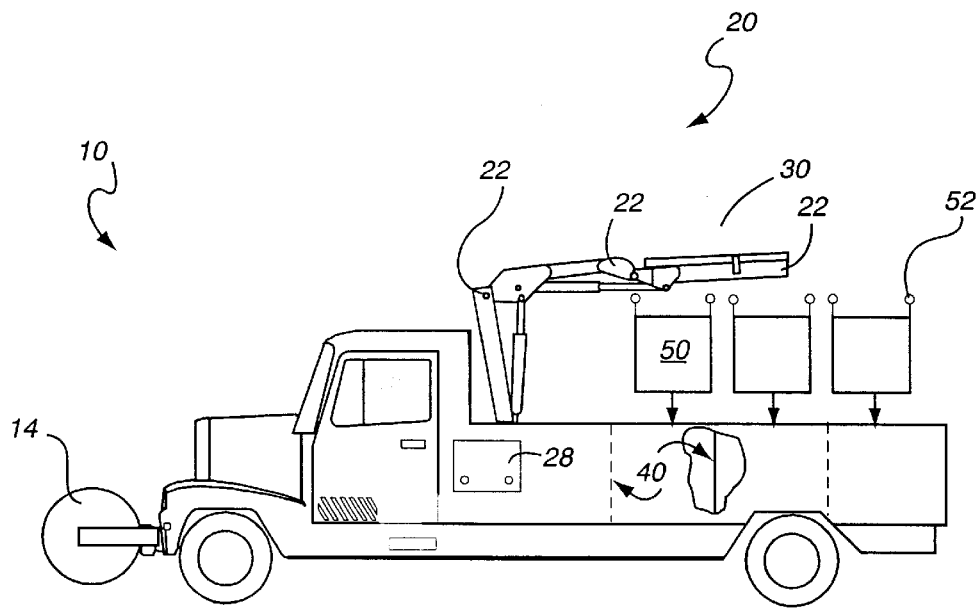
FIG. 1 is a side elevational view of a presently preferred embodiment of an improved multi-task truck according to the present invention, with a front mounted hose reel, a crane in the extended position, and containers shown prior to being received in the segmented truck body.

Referring to FIG. 1, shown is a presently preferred embodiment 10 of a multi-task truck according to the present invention. A hose reel 14 is preferably mounted to the front of the truck 10. The hose reel 14 is preferably moveable by a hydraulic system that also operates a water pump (not shown) that provides high pressure water through the hose reel. The water pump can be placed anywhere on the truck and is powered by a hydraulic pump (not shown) that is preferably powered by the truck's engine.

A multi-purpose crane assembly 20 (preferably powered by the same or different hydraulic pump as the front mounted hose reel) is preferably mounted directly behind the cab of the truck. Preferably, the crane assembly 20 comprises one or more hydraulic extensions 22 and provides a lifting capacity of between 500–25,000 pounds. Preferably, three hydraulic extensions 22 are provided and the controls for the crane assembly are mounted in the cab or on hydraulic valve banks 28 on both the left and right sides of the truck. Preferably, a catch basin cleaning assembly 30 is provided at the end of the crane boom formed by all of the hydraulic segments 22. Preferably, the catch basin cleaning assembly 30 comprises two hydraulic hose reels, a winch and a bucket assembly, as is conventional.

Various hydraulic work tools that can be powered by the crane's hydraulic system are preferably also provided. Those tools may include, but are not limited to, the following: paving breaker, tamper, sump pump, limb lopper, tree saw, generator, hose reels, hydraulic hose and couplings, and pressure relief manifolds and related equipment. Obviously, when a generator is attached, the generator can be used to power electrical apparatus, such as work lights for night work. Each of the hydraulic valve banks 28 is provided with at least an inlet valve, an outlet valve and a control valve for adjusting the pressure in the crane's hydraulic system to the range of pressure necessary for each tool. Accordingly, a different tool can be attached to each hydraulic valve bank, thus allowing, for example, simultaneous operation of the generator for providing night lights and a jack hammer.

Preferably, the payload area of the truck is divided into three segments by inner lockable tailgates 40. Thus, for example, if the payload area is 12 feet long and 8 feet wide, two inner lockable tailgates 40 are provided to divide the payload area into three compartments that are 4 feet long and 8 feet wide. Preferably, the inner lockable tailgates 40 are moveable and removable.

Separate removable containers 50, that are configured to be received into the compartments, are provided. Each of these containers preferably is provided with eyes 52 attached to the corners. Lifting straps (not shown) can then be attached to the eyes 52 and joined together with a single eye (not shown) so that the container can be lifted by a hook attached to that single eye, as is conventional.

In use, the containers 50 will be loaded on the ground and then lifted into place in a corresponding compartment. For example, a first segment could be filled with "hard goods," such as spare parts, a second container could be filled with bricks, and a third container could be filled with sand and cement for mixing at a site. Obviously, the number of compartments and segments can be varied as desired.

Figure 2:
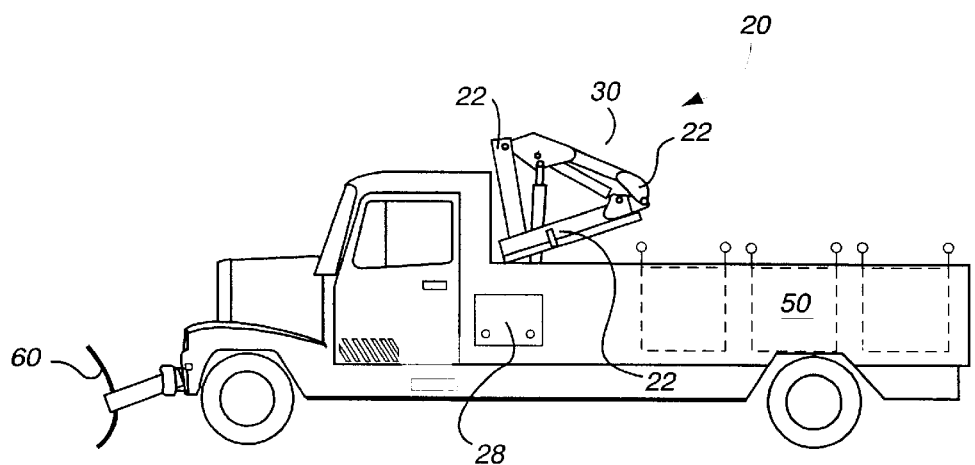
FIG. 2 is a side elevational view of the truck of FIG. 1 with a snow plow substituted for the front mounted hose reel and the crane in the retracted position.

Referring to FIG. 2, shown is the truck of FIG. 1 with a snow plow 60 substituted for the hose reel 14. The crane assembly 20 is shown in the retracted position and the containers 50 have been received in the compartments.

Figure 3:
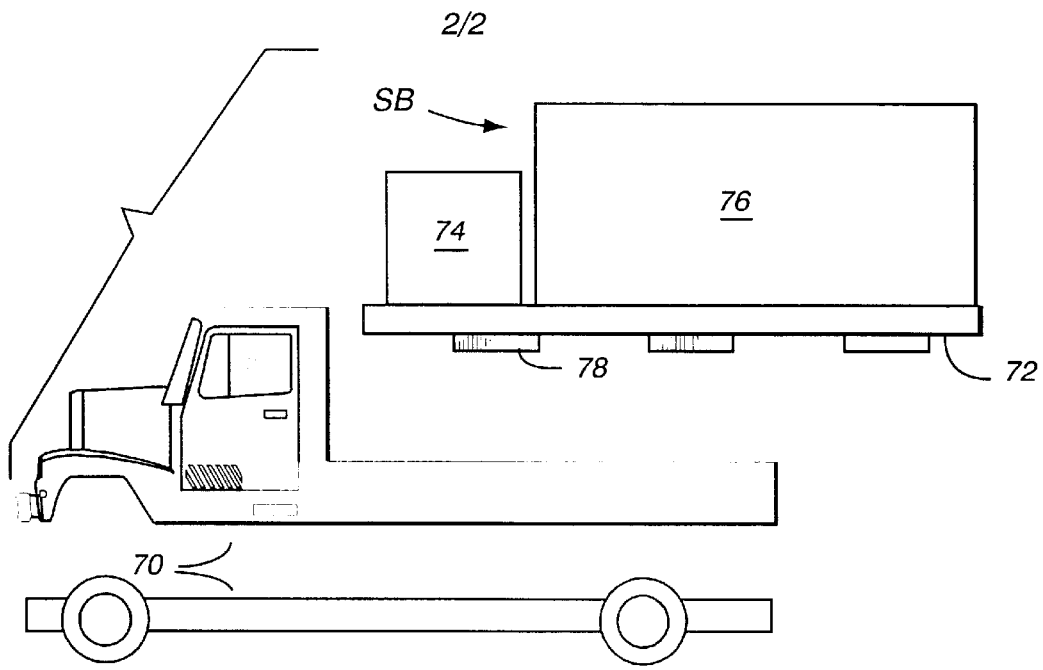
FIG. 3 is a side elevational view of an alternative body before it is substituted for the truck body of FIGS. 1 and 2.

Referring to FIG. 3, shown is the chassis and cab 70 of the truck with the body removed, and a substitute body SB positioned to be mounted on the chassis 70. The substitute body SB optionally comprises a slide plate 72 on which multiple cooperating components can be mounted. For example, in FIG. 3, a vacuum pump 74 is mounted on the slide plate 72 and is operatively connected to a vacuum tank 76 that is also mounted on the slide plate 72. In this manner, the truck can easily be converted to a vacuum truck merely by attaching and detaching the slide plate 72, to which the vacuum pump 74 and vacuum tank 76 have previously been attached. This allows for easy modularization of the truck, so that only one component, namely the slide plate, needs to be attached and detached (rather than separately attaching and detaching the vacuum pump 74 and vacuum tank 76). Preferably, the slide plate 72 comprises a single piece of steel, approximately ⅜" thick diamond plate steel (steel with a diamond pattern embossed thereon for traction), approximately eight feet wide and approximately 12 feet long. Preferably, the slide plate 72 has a slot in front, and a hydraulically operated hook mounted on the truck frame engages with the slot to lock the slide plate to the chassis 70. Preferably also, the slide plate 72 is provided with shear plates 78 that can be bolted to the cab and chassis of the truck. This system is available from American Roll-Off. A substitute truck body SB can then be mounted on and attached to the slide plate 72 and hydraulically locked thereon, thus allowing the chassis 70 to be used with a different truck body, such as a garbage truck body. This allows municipalities or other users to make better use of their investment in the multi-task truck. Of course, if substitute bodies do not need additional components, or separately mounting and dismounting separate components is acceptable, components can be directly attached using shear plates, without using a slide plate 72.

Figure 4:
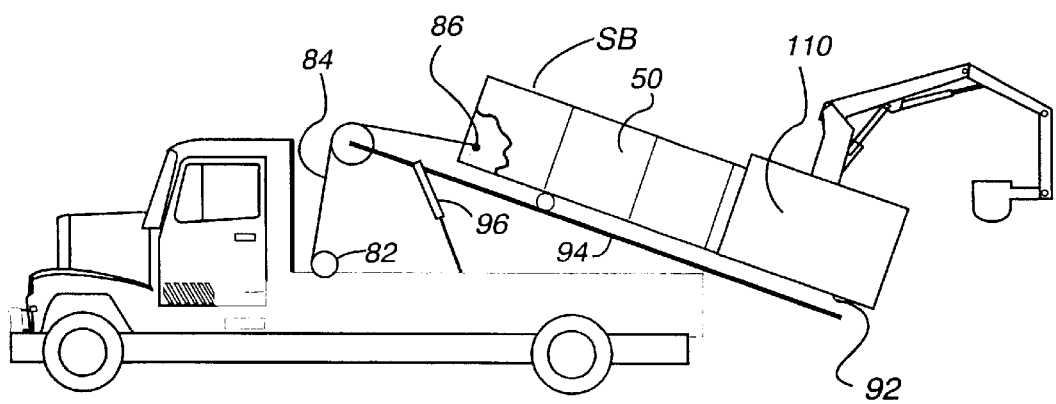
FIG. 4 is a side elevational view of a preferred embodiment of the present invention with a backhoe and using rollers.

Referring to FIG. 4, shown is another preferred embodiment of the present invention. Instead of the slide plate system shown in FIG. 3, a winch 82 pulls on a cable 84 that is attached to a hook 86 on a substitute body SB. The substitute body SB is provided with rollers 92 that ride on rails 94 that can be raised and lowered with hydraulic arms 96.

In this manner, various substitute bodies SB can be rolled on or off the chassis and cab 70 for easy and quick substitution. In this embodiment, the crane of FIGS. 1 and 2 is removed and the containers 50 are moved forward to allow a backhoe 110 to be mounted on the rear end of the substitute body SB, preferably over the rear wheels. Because the backhoe 110 is on the rear end of the truck, the entire mass of the truck keeps the backhoe stabilized while in use.

With the above multi-task truck, the municipality or other user can use a single truck instead of having separate sewer flushers, drain trucks and vacuum trucks.

Of course, the truck of the present invention can be adapted for many other uses, such as cleaning and maintaining petroleum transportation and distilling equipment.

Because the present truck can handle multiple tasks, it is not necessary to provide separate trucks, with separate crews, for a single project, thus resulting in economies of equipment and manpower.

Industrial Applicability

This invention can be used whenever it is desired to provide an improved multi-task truck.

What is claimed is:

1. A device comprising:

a chassis having a front chassis end and a rear chassis end, and a first chassis side and a second chassis side;

an engine mounted on said chassis;

a cab positioned on said chassis between said front chassis end and said rear chassis end;

a mount positioned on said chassis between said cab and said rear chassis end;

a crane having a hydraulic system operably connected to said engine, having at least one hydraulic extension, mounted on said chassis;

at least two hydraulic valve banks operably connected to said hydraulic system, mounted on said chassis, whereby said crane and at least one of a plurality of hydraulic tools can be simultaneously and independently operated;

a body having a first body end and a second body end, a first body side and a second body side, and a bottom, said ends, said sides, and said bottom defining a payload area, interchangeably mounted on said mount; and at least 2 tailgates positioned in said payload area, dividing said payload area into at least 3 compartments, each of said compartments configured to removably receive form-fitted containers.

2. A device according to claim 1, wherein said tailgates comprise:

first and second inner lockable tailgates, positioned in said payload area between said first body end and said second body end, substantially perpendicular to said first body side and said second body side, whereby said payload area is divided into 3 compartments, each of said compartments configured to removably receive form-fitted containers.

3. A device according to any one of claims 1 or 2, wherein said form-fitted containers further comprise:

eyes located on the corners of said form-fitted containers, whereby said eyes allow lifting of said form-fitted containers into and out of said compartments.

* * * * *